United States Patent
Da Palma et al.

(10) Patent No.: US 6,917,677 B2
(45) Date of Patent: Jul. 12, 2005

(54) METHOD AND SYSTEM FOR DEFINING CALL TRANSFER RULES FOR DIRECTORY ASSISTANCE

(75) Inventors: William V. Da Palma, Coconut Creek, FL (US); Brent L. Davis, Deerfield Beach, FL (US); Reza Ghasemi, Pompano Beach, FL (US); John R. Lauria, Wellington, FL (US); Vanessa V. Michelini, Boca Raton, FL (US); Sibyl C. Sullivan, Highland Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 10/083,225

(22) Filed: Feb. 26, 2002

(65) Prior Publication Data

US 2003/0161458 A1 Aug. 28, 2003

(51) Int. Cl.$^7$ .............................................. H04M 3/493
(52) U.S. Cl. ............................ 379/218.01; 379/216.01; 379/355.05; 379/355.08
(58) Field of Search ........................ 379/212.01, 216.01, 379/218.01, 355.01, 355.05, 355.08, 355.09

(56) References Cited

U.S. PATENT DOCUMENTS

| | | | | | |
|---|---|---|---|---|---|
| 5,204,894 | A | * | 4/1993 | Darden | 379/88.03 |
| 5,241,589 | A | | 8/1993 | Jefferson | 379/355.01 |
| 5,483,586 | A | * | 1/1996 | Sussman | 379/218.01 |
| 5,550,915 | A | | 8/1996 | Partridge, III | 379/355.08 |
| 5,644,633 | A | | 7/1997 | Kaufeld et al. | 379/357.05 |
| 5,764,741 | A | | 6/1998 | Barak | 379/114.02 |
| 6,000,031 | A | * | 12/1999 | Bingaman et al. | 713/200 |
| 6,137,877 | A | | 10/2000 | Robin et al. | 379/352 |
| 6,731,737 | B2 | * | 5/2004 | Davis et al. | 379/218.01 |

* cited by examiner

*Primary Examiner*—Harry S. Hong
(74) *Attorney, Agent, or Firm*—Akerman Senterfitt

(57) ABSTRACT

A automated method of transferring calls can include, within an established call with a calling party, receiving from the calling party a request specifying a name. The name can be compared with a listing of names and associated directory numbers to determine if there is a match. A directory number associated with the matched name can be processed according to translation attributes to determine a dialable number. The dialable number can be sent to a telephony switch to transfer the call.

27 Claims, 3 Drawing Sheets

200

| Attribute | Action / Definition |
|---|---|
| Internal Number Identifiers | A Directory number is determined to be an internal number if the directory number begins with one of these digit sequences. |
| Internal Prefix | The prefix to be added if the directory number is internal. |
| Internal Suffix | The suffix to be appended if the directory number is internal. |
| Extension Length | The length of internal extensions. The extension length attribute can specify the location of the digits within the directory number. |
| Local Area Codes | Area codes where the system is operational. |
| Local Area Code Exceptions | Specifies numbers that while beginning with a local area code, should not be treated as local numbers. |
| Long Distance Prefix | The prefix to add for long distance calls. |
| Long Distance Suffix | The suffix to append for long distance calls. |
| Prefix | The prefix to add to get an external line. This prefix can be added to all external calls. |
| Suffix | The suffix to add to external numbers. This suffix will be appended to all external numbers. |
| Substitutions | Defines digit groupings and substitution digits for the specified digit groupings. |
| Tie Prefix | The prefix to be added to access a tie-line. |
| Tie Suffix | The suffix to be appended for accessing a tie-line. |

Figure 2

METHOD AND SYSTEM FOR DEFINING CALL TRANSFER RULES FOR DIRECTORY ASSISTANCE

BACKGROUND OF THE INVENTION

1. Technical Field

This invention relates generally to telephony, and more particularly, to building dialable numbers according to defined directory assistance attributes or rules.

2. Description of the Related Art

A directory dialer system can establish a telephone call with a caller, receive a request from the caller to be connected to a particular party, whether a person or entity, and then proceed to connect the caller with the requested party. Thus, the caller need only dial a number and make a request to be transferred. The directory dialer system identifies a directory number associated with the requested party and then provides the directory number to a telephony switch. The telephony switch then transfers the established telephone call between the directory dialer system and the caller, thereby transferring the caller to the directory number associated with the requested party.

Presently, directory dialer systems access a database having directory numbers associated with a listing of names. The directory number stored within the database, however, may not be the preferred number for contacting the requested person. For example, a directory dialer system typically is not aware of the location of the telephony switch which will transfer the call, which protocols are used, or which switch specific parameters are necessary to complete the call transfer. Further, although business entities frequently rely on directory dialer systems to specify the number to be used when routing calls, the directory dialer system is not aware of company specific preferences regarding the appropriate number to dial when calling a party. In other words, conventional directory dialer systems lack the intelligence to route calls other than to a predetermined extension or directory number. As such, conventional directory dial systems are not equipped to dynamically implement particular call strategies and cost-saving measures. For example, an internal caller requesting to speak with another internal caller should be connected using an internal extension, not by initiating an outgoing call that will be directed back to the same business entity.

SUMMARY OF THE INVENTION

The invention disclosed herein can intelligently determine numbers within a directory assistance or directory dialer system to transfer calls. In particular, one or more translation attributes can be defined. A call can be established between a calling party and a directory dialer system. A request specifying a name can be received over the established telephone call from the calling party. The request, for example, can be one or more dual tone multi-frequency digits specifying the name of an individual, a business entity, or some other listing, or can be a user spoken utterance specifying the name which can be speech recognized. Regardless, the name, once identified, can be compared with a listing of names and associated numbers to determine if there is a match. A number associated with the matched name then can be processed according to the translation attributes to determine a dialable number. The translation attributes, for example, can be local switch specific translation attributes. The dialable number then can be sent to a telephony switch to transfer the call.

The directory number can be processed according to the translation attributes which can specify local area codes, a defined service area, telephony protocols, telephony switch specific parameters for completing the call transfer, and company specific dialing preferences. For example, a determination can be made as to whether the directory number is an internal number or an external number. For internal numbers, an internal extension can be identified from within the directory number. Additionally, a predetermined internal prefix and/or a predetermined internal suffix can be added to the directory number.

For directory numbers determined to be external numbers, a further determination can be made as to whether the directory number is a local number or a long distance number. For long distance numbers, a predetermined long distance prefix and/or a predetermined long distance suffix can be added to the directory number. Additionally, a specified grouping of digits can be identified within the directory number and then replaced with predetermined substitute digits.

The retrieved directory number also can be processed to determine whether the directory number is associated with a tie-line. If so, a tie-line prefix and/or a tie-line suffix can be added to the directory number.

Another aspect of the present invention can include a directory assistance system including a database specifying a listing of names and corresponding directory numbers, and an interactive voice response unit. The interactive voice response unit can be configured to receive a request for a name from a calling party over an established call, to compare the name with the listing of names to determine if there is a match, to process a directory number associated with the matched name according to translation attributes to determine a dialable number, and to send the dialable number to a telephony switch to transfer the call. The system further can include a telephony switch being operatively connected to the interactive voice response unit. The telephony switch can be configured to receive the dialable number and to transfer the call to the dialable number.

BRIEF DESCRIPTION OF THE DRAWINGS

There are shown in the drawings embodiments which are presently preferred, it being understood, however, that the invention is not limited to the precise arrangements and instrumentalities shown.

FIG. 2 is a table illustrating exemplary attributes and associated actions and definitions which can be used within the call processing system of FIG. 1.

DETAILED DESCRIPTION OF THE INVENTION

The invention disclosed herein provides a method and system for intelligently determining telephone numbers within a directory dialer or directory assistance system. Specifically, a caller can call a directory dialer system and request the name of a party, whether that party is an individual, a business entity, or some other listed entity. The request can be received as a speech request or as one or more dual tone multi-frequency digits originating from the caller's telephony equipment and specifying the requested party. Despite the manner in which the request is made, a directory number corresponding to the requested party can be determined. The directory number can be processed in accordance with one or more translation attributes to determine a dialable number, that is a number associated with the requested party that is determined in compliance with predetermined translation attributes. The translation attributes, for example, can be location dependent or business specific. The dialable number then can be provided to a suitable telephony switch for transferring the caller's telephone call.

Figure 1:
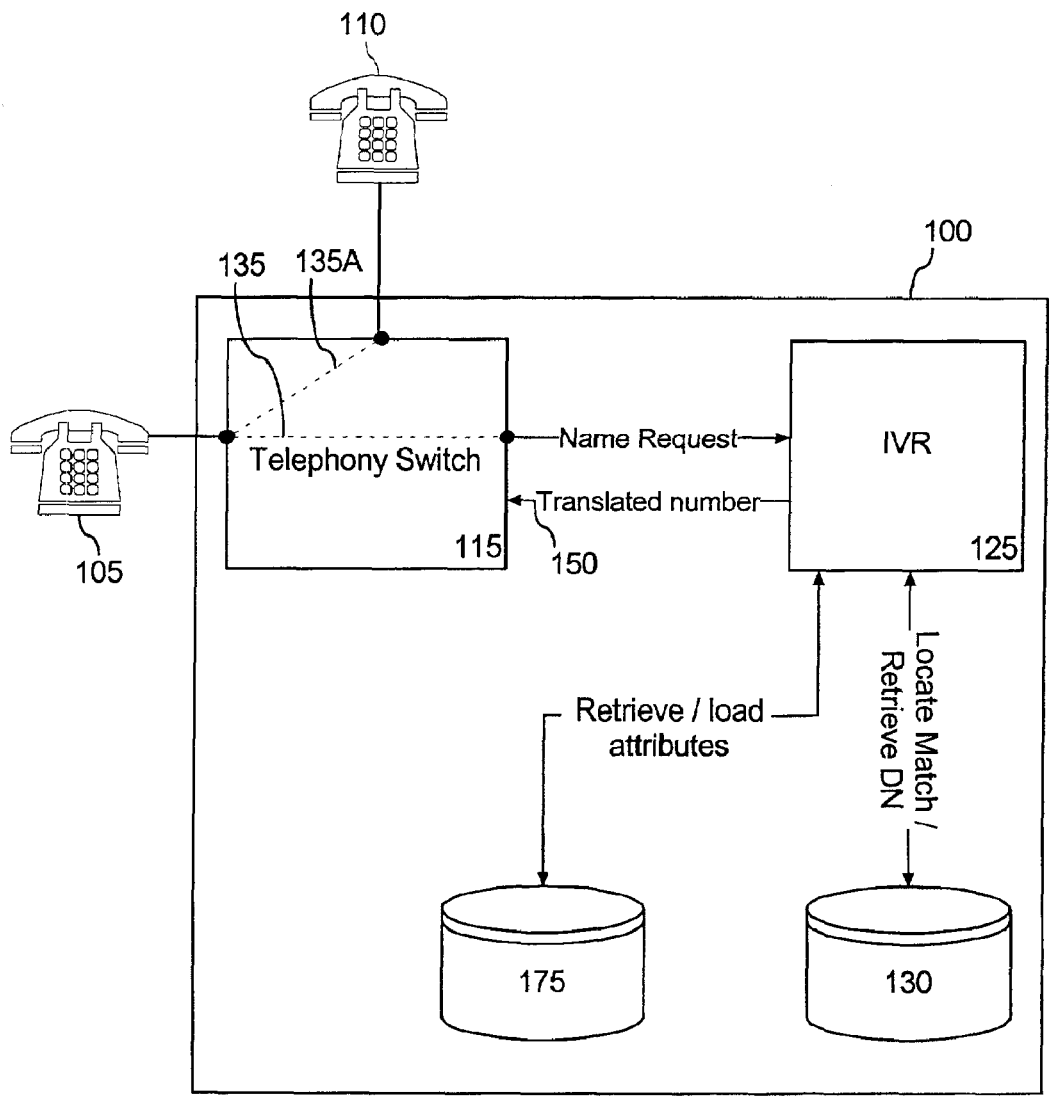
FIG. 1 is a schematic diagram of a call processing system for determining dialable numbers in accordance with the inventive arrangements disclosed herein.

FIG. 1 is a schematic diagram of a call processing system 100 for determining dialable numbers in accordance with the inventive arrangements disclosed herein. As shown, call processing system 100 can be used to answer directory assistance calls from a caller 105, process the call, and subsequently transfer the call to a called party 110, such that caller 105 and the called party 110 are connected in the resulting telephone call. The term telephone call, however, is not limited to land-line telephony communications links. Rather, as used herein, telephone calls or calls can include any of a variety of voice communication links including land-line and wireless voice communications links, whether such calls are routed through the telecommunications network or a data communications network, such as voice over IP. Accordingly, call processing system 100 can include a telephony switch 115 communicatively linked to an interactive voice response unit (IVR) 125, as well as a database 130 and a database 175, each being operatively connected to the IVR 125 and/or the telephony switch 115.

The telephony switch 115 can include one or more telephone switches or switching systems as are well known in the art. For example, the telephony switch 115 can include a conventional telephone switching system as can be found in a central office. In another aspect of the present invention, the telephony switch 115 can include a private branch exchange (PBX) for switching calls between users within a business or enterprise.

The IVR 125 can accept a combination of voice telephone input and touch-tone keypad selections (DTMF digits) and provides appropriate responses in the form of voice, fax, callback, e-mail, as well as other media. The IVR 125 can be communicatively linked to the database 130 to provide directory dialer functions such as directory assistance and call forwarding. The database 130 can be included within the IVR 125, the telephony switch 115, or can be a distributed database communicatively linked to the telephony switch 115 and/or the IVR 125. In any case, database 130 can include a directory or listing of names of parties including individuals, employees, businesses, and the like, depending upon the particular implementation, as well as directory numbers associated with the named parties.

The database 175, which can be implemented local to the IVR 125, can include a set of rules or translation attributes for processing the directory numbers contained therein. In particular, the translation attributes can specify information used to determine where and how to transfer the received call. In one aspect of the present invention, the translation attributes can be location dependent according to the location of the system or the area the call processing system is to service. In another aspect, the translation attributes can be tailored to the preferences of a particular business.

For example, the information stored within the database 175 can be used to determine whether the call to be transferred to the called party 110 is to be transferred using a tie-line number, an internal extension number, or an external number. The information further can specify whether the call is to be transferred within the same area code, a different area code, to another country, or to a local toll number. The database 175 also can include other country specific information and directory number processing information such as access codes and control characters, both of which can be used for interacting with particular telephony switches and accessing particular local or long distance carriers, service providers, services, and features.

In one aspect, the invention disclosed herein can be made available as a centrex service wherein the phone company's centralized facilities are partitioned off to be made available to private businesses thereby alleviating the need for the business to purchase its own telephony equipment. In that case, although a business may have a PBX system, the telephony switching system 115, and any necessary databases 130 and/or 175 can be located within the central office. Alternatively, the components can be located on site at a business and interact with a telephony switch located within a central office. Those skilled in the art will recognize that the components of system 100, as disclosed herein, can be located at any of a variety of different locations, and as such, can exist in any of a variety of hardware configurations. Accordingly, the embodiments disclosed herein are for purposes of illustration only, and are not intended as a limitation on the present invention.

In illustration, caller 105 can initiate a call 135 to a number such as a directory number or an internal extension number associated with a directory dialer or directory assistance system. Accordingly, the call 135 can be established between the caller 105 and the IVR 125 via the telephony switch 115. For example, if the caller 105 is located on premises with the directory dialer system, the call 135 can be established with a PBX telephony switch. If the caller 105 is remotely located from the directory dialer system, the call 135 can be established by a centralized telephony switch and an optional PBX switch.

Once the call is established, the IVR 125 can provide instructions to the caller 105 for requesting a party name as well as any necessary prompts. The caller 105 can request a name in accordance with the instructions provided by the IVR 125. For example, the caller 105 can request the name by activating keys on the caller's telephony equipment or by speaking the name. The IVR 125 can receive and identify the requested name by processing the received DTMF digits or by speech recognizing the user spoken utterance. The IVR 125 then can access database 130 to locate a matching name. If a match is found, the directory number associated with the requested name can be identified. One or more translation attributes can be retrieved from the database 175 as well.

The IVR 125 can process the identified directory number associated with the requested name in accordance with the retrieved translation attributes. In particular, the IVR 125 can modify the identified directory number so that the call can be transferred using a tie-line number, an internal extension number, local or long distance dialing, or the like as specified by the translation attributes. For example, if the call can be transferred using internal call processing systems such as a PBX, the translation attributes can be used to determine the extension corresponding to the received name from the retrieved directory number. The resulting translated number 150 can be provided to the telephony switch 115 for transferring the call as appropriate. The telephony switch, using the number obtained from the IVR 125, can transfer the call thereby connecting caller 105 to called party 110 through the telephony switch 115. Thus, caller 105 and called party 110 can be communicatively linked via call 135A.

FIG. 2 is a table 200 illustrating exemplary attributes, associated actions, and definitions which can be used within the call processing system of FIG. 1. As shown in FIG. 2, table 200 defines a plurality of attributes specifying prefixes and suffixes which can be added to directory numbers as necessary. Each of the attributes can include one or more digits, alphanumeric characters, and/or control characters. Thus, although the following description of the present invention refers to digits, it is to be understood that digits, as used herein, can refer to digits, alphanumeric characters, and other control characters.

The control characters can specify pauses, for example, when accessing a telephone switch having analog lines. Other attributes define groupings of one or more digits which signify when a directory number is an internal number, the extension length of an internal number, local area codes, exceptions to local area codes, as well as substitution rules for identifying particular digit groupings and replacing those groupings with one or more other digits. Notably, the translation attributes can be determined by an operator or system administrator so that each of the translation attributes can be tailored to the area in which the system is to be used, or the area which the system is to service. Additionally, each of the translation attributes can be tailored to suit the call transfer policy of a particular business to better take advantage of tie-lines, internal dialing, and other calling features or services provided by the business's local or long distance telecommunications carrier and/or service provider.

The internal number identifiers can define a sequence of digits corresponding to internal numbers. For example, if directory numbers are stored within a directory assistance system as 123-456-7890, the internal number identifier can specify that all directory numbers having an area code of 123 and an exchange of 456 are internal numbers. Notably, the hyphens have been included within the directory number for readability. The internal prefix attribute can specify one or more digits to be included with an internal extension number for correctly dialing the number. For example, the internal prefix attribute can specify that a 7 is to be added to the beginning of an internal extension when dialing such a number. The internal suffix attribute can define one or more digits to be appended to an extension when dialing an internal number. The extension length attribute can specify the number of digits or length of internal extensions within an organization, as well as the location of those digits within a number.

For example, the directory number 123-456-7890 can be identified as an internal number if the internal number identifier attribute specifies that directory numbers having an area code of 123 and an exchange of 456 are internal numbers. If the extension length attribute specifies a value of 4, then, in this case, the last 4 digits can be extracted from the directory number resulting in an extension of 7890. The internal prefix, for example, can specify that a 7 must be dialed preceding an extension for internal numbers. Thus the directory number 123-456-7890 can be transformed to the internal extension 7-7890.

The local area code attribute can specify the local area codes in which the system is operational, or the local area codes in which the directory dialer provides service (service area). The local area codes exception attribute can specify cases where the local area codes will not be removed from a directory number. Such directory numbers can be considered to be local numbers, but require dialing the area code in addition to the remaining seven digit number. For example, the local area codes exception attribute can specify area codes and exchanges. The long distance prefix attribute can specify any digits which must be added to the beginning of a directory number to dial a particular service provider's system, a particular feature, or to dial a long distance number in general. For example, the long distance prefix attribute can specify an access code, a 1 for accessing long distance service, or any other combination of digits and/or control characters. The long distance suffix attribute functions similar to the long distance prefix attribute, but is appended to a directory number.

The prefix attribute can specify one or more digits which must be dialed to access an outside line. For example, dialing a 9 within enterprise telephony systems often accesses an outside line for placing a call to a number outside of the enterprise. The suffix attribute can specify one or more digits which must be appended to a directory number to access an outside line. The substitution attribute can specify a grouping of one or more digits which are to be substituted for a predetermined series of one or more digits. For example, a substitution can specify an area code such as 345 which is a long distance call from the area in which the system is operating or servicing. Thus, the substitution can specify that when the area code 345 is identified, the digit sequence 1345 is to be substituted. The substitution attribute further can specify that a pause is to be inserted between the 1 and the 3 of the exchange. The pause, for example, can be specified with the insertion of a comma. As another example, the substitution attributes can specify that the numbers 123-456 from the directory number 123-456-7890 are to be replaced with 456, indicating that the area code need not be dialed for this number.

Other attributes for identifying numbers accessible through a tie-line also can be specified. A tie prefix attribute can specify digits to be added to the beginning of a directory number for accessing a tie-line. The tie suffix can specify one or more digits and/or control characters that must be appended to a directory number to access a tie-line.

The translation attributes listed in table 200 are for purposes of illustration only, and therefore, should not be construed as a limitation on the inventive arrangements disclosed herein. Additional translation attributes can be defined for other call types as required by the system or for any other call type which a directory assistance system can be programmed to accommodate. In one embodiment, attributes can be added and defined by an operator or system administrator as additional services and call types are added to the directory assistance system. Additionally, attributes can specify codes to be dialed to access particular features, services, and/or service providers in accordance, for example, with a business's preferred dialing policy and the operating area of the directory assistance system.

Figure 3:
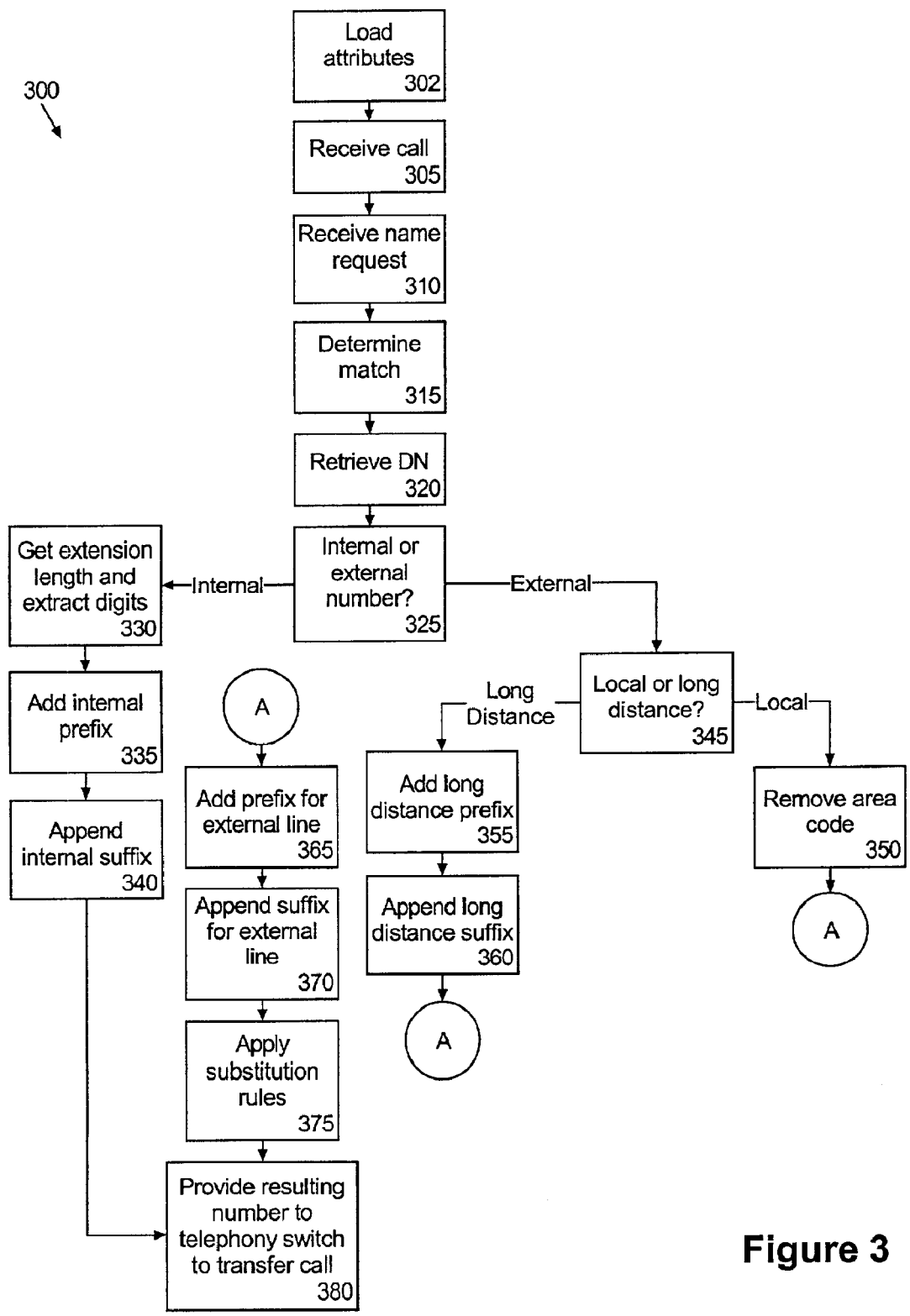
FIG. 3 is a flow chart illustrating a method of processing directory assistance calls as performed by the call processing system of FIG. 1.

FIG. 3 is a flow chart illustrating a method 300 of processing directory assistance calls as performed by the call processing system of FIG. 1. The method 300 can begin in a state wherein an incoming telephone call can be answered. Accordingly, in step 302, the translation attributes can be retrieved and loaded from the translation attributes database. In another aspect of the invention, however, the translation attributes can be programmed within the call processing system and need not be retrieved from the database. In step 305, an incoming call can be received and answered. One or more voice prompts can be provided to the caller to properly guide the caller during the call. In step 310, a name can be received. For example, the caller can key in a name using the keypad of a telephone or can specify a name by speaking the name. In either case, the name can be identified, whether the name is determined from a series of received DTMF key responses or is speech recognized.

In step 315, a match for the received name can be determined from the database of names and associated directory numbers. In step 320 the directory number associated with the matched name can be retrieved from the directory database. In step 325, a determination can be made as to whether the retrieved directory number is an internal number or an external number. For example, the retrieved directory number can be compared with the internal number identifier attribute. If the retrieved directory number is an internal number, the method can proceed to step 330. If not, the method can continue to step 345.

Continuing with step 330, where the retrieved directory number has been determined to be an internal number, the extension length of internal numbers can be identified. For example, the extension length attribute can be consulted to determine the length of internal number extensions. The retrieved number then can be truncated to the extension length resulting in an internal extension. Notably, the extension length attribute can specify which digits of the retrieved directory number constitute an internal extension, such as the beginning "n" digits, the ending "n" digits, or other "n" digits as the case may be.

In step 335, one or more digits which may be needed to dial an internal extension can be added to the beginning of the extension with reference to the internal prefix attribute. In step 340, with reference to the internal suffix attribute, any digits needed to dial an internal extension can be appended to the end of the extension. The method can proceed to step 380, where the resulting extension along with any internal prefixes and/or suffixes can be provided to a telephony switch. Accordingly, the call received in step 305 can be transferred to the determined internal extension.

In step 345, in the case where the retrieved directory number was determined to be an external number, with reference to the local area codes attribute, a further determination can be made as to whether the retrieved directory number is a local number or a long distance number. If the directory number is determined to be a local number, the method can continue to step 350, where the area code can be removed from the directory number. Continuing to step 365, a prefix can be added to the directory number in the event that additional digits are necessary to access an outside line. In step 370, a suffix can be appended to the retrieved directory number if additional digits are needed to access an outside line. In step 375, one or more substitution rules can be applied to the directory number if applicable; and in step 380, the resulting number can be provided to the telephony switch to transfer the call to the resulting number.

In the case where the retrieved directory number was determined to be a long distance number, the method can proceed to step 355. In step 355, any long distance prefixes necessary to dial a long distance call or access a particular long distance service or carrier can be added to the retrieved directory number. In step 360, any suffixes required to dial a long distance call, access a particular long distance service or carrier can be appended to the retrieved directory number. The method then can proceed to step 365 where any prefix necessary for accessing an outside line can be added. Any suffix necessary to access an outside line can be appended to the directory number in step 370. Substitution rules can be applied in step 375; and in step 380, the resulting number can be provided to a telephone switch so the call from step 305 can be transferred to the resulting telephone number.

As mentioned, the various embodiments described herein are for purposes of illustration only and are not intended as a limitation on the present invention. Rather, users of the present invention can tailor translation attributes according to a business's call transfer policy, the location of the business, the operating area, as well as for particular telephony switches, features, carriers, or services. Moreover, additional translation attributes may be defined to accommodate other call types, area codes, telephony switches, features, services, local or long distance carriers, and the like.

Finally, those skilled in the art will recognize that the various translation attributes disclosed herein can be variable in length and specify any of a variety of control characters, letters, numbers, and/or alphanumeric symbols. Accordingly, the present invention is not limited, for example, to use solely with telephony systems conforming to the North American plan. Rather, as the translation attributes can be created and varied in both content and length, the present invention can be used in regions having telephony systems differing from that of North America. Thus, for example, area codes can be defined as the first two digits of a number rather than the first three digits.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. An automated method of transferring a call comprising:
   within an established call with a calling party, receiving from said calling party a request specifying a name;
   comparing said name with a listing of names and associated directory numbers to determine if there is a match;
   processing a directory number associated with said matched name to select a dialable number from among a set of numbers, said selection based upon a set of customizable dialing preferences and a set of customizable translation attributes; and
   sending said dialable number to a telephony switch to transfer said call.

2. The method of claim 1, said processing step further comprising:
   processing a directory number associated with said matched name according to local switch specific translation attributes.

3. The method of claim 2, said processing step comprising:
processing said directory number according to translation attributes selected from the group consisting of local area codes, a defined service area, telephony protocols, telephony switch specific parameters for completing said call transfer, and company specific dialing preferences.

4. The method of claim 3, further comprising:
specifying said translation attributes.

5. The method of claim 2, said receiving step further comprising:
receiving a user spoken utterance specifying said name; and
speech recognizing said user spoken utterance to determine said name.

6. The method of claim 2, said receiving step further comprising:
receiving dual tone multi-frequency key input specifying said name.

7. The method of claim 1, said processing step further comprising:
determining whether said directory number is an internal number or an external number.

8. The method of claim 7, said processing step further comprising:
for said internal number, identifying an internal extension within said directory number.

9. The method of claim 8, said processing step further comprising:
adding at least one of a predetermined internal prefix and a predetermined internal suffix to said directory number.

10. The method of claim 7, said processing step further comprising:
for said external number, determining whether said directory number is a local number or a long distance number.

11. The method of claim 10, said processing step further comprising:
for said long distance number, adding at least one of a predetermined long distance prefix and a predetermined long distance suffix to said directory number.

12. The method of claim 10, said processing step further comprising:
identifying a specified grouping of digits within said number and replacing said identified grouping with predetermined substitute digits.

13. The method of claim 1, said processing step further comprising:
determining that said directory number is associated with a tie-line; and
adding at least one of a tie-line prefix and a tie-line suffix to said directory number.

14. A directory assistance system comprising:
a database specifying a listing of names and corresponding directory numbers; and
an interactive voice response unit configured to receive a request for a name from a calling party over an established call, to compare said name with said listing of names to determine if there is a match, to process a directory number associated with said matched name to select a dialable number, from among a set of numbers, and to send said dialable number to a telephony switch to transfer said call;
said selection based upon a set of customizable dialing preferences and a set of customizable translation attributes.

15. The system of claim 14, further comprising:
a telephony switch operatively connected to said interactive voice response unit, wherein said telephony switch is configured to receive said dialable number and transfer said call to said dialable number.

16. A machine-readable storage, having stored thereon a computer program having a plurality of code sections executable by a machine for causing the machine to perform the steps of:
within an established call with a calling party, receiving from said calling party a request specifying a name;
comparing said name with a listing of names and associated directory numbers to determine if there is a match;
processing a directory number associated with said matched name to select a dialable number from among a set of numbers, said selection based upon a set of customizable dialing preferences and a set of customizable translation attributes; and
sending said dialable number to a telephony switch to transfer said call.

17. The machine-readable storage of claim 16, said processing step further comprising:
processing a directory number associated with said matched name according to local switch specific translation attributes.

18. The machine-readable storage of claim 17, said processing step comprising:
processing said directory number according to translation attributes selected from the group consisting of local area codes, a defined service area, telephony protocols, telephony switch specific parameters for completing said call transfer, and company specific dialing preferences.

19. The machine-readable storage of claim 17, said receiving step further comprising:
receiving a user spoken utterance specifying said name; and
speech recognizing said user spoken utterance to determine said name.

20. The machine-readable storage of claim 17, said receiving step further comprising:
receiving dual tone multi-frequency key input specifying said name.

21. The machine-readable storage of claim 16, said processing step further comprising:
determining whether said directory number is an internal number or an external number.

22. The machine-readable storage of claim 21, said processing step further comprising:
for said internal number, identifying an internal extension within said directory number.

23. The machine-readable storage of claim 22, said processing step further comprising:
adding at least one of a predetermined internal prefix and a predetermined internal suffix to said directory number.

24. The machine-readable storage of claim 21, said processing step further comprising:
for said external number, determining whether said directory number is a local number or a long distance number.

25. The machine-readable storage of claim 24, said processing step further comprising:

for said long distance number, adding at least one of a predetermined long distance prefix and a predetermined long distance suffix to said directory number.

26. The machine-readable storage of claim 24, said processing step further comprising:

identifying a specified grouping of digits within said number and replacing said identified grouping with predetermined substitute digits.

27. The machine-readable storage of claim 16, said processing step further comprising:

determining that said directory number is associated with a tie-line; and adding at least one of a tie-line prefix and a tie-line suffix to said directory number.

* * * * *